United States Patent
Haring et al.

(10) Patent No.: US 11,619,777 B2
(45) Date of Patent: Apr. 4, 2023

(54) ILLUMINABLE PANE UNIT

(71) Applicant: Glass Technology GmbH, Vienna (AT)

(72) Inventors: Heinz Haring, Vienna (AT); Andreas Wiesmueller, Vienna (AT)

(73) Assignee: Glass Technology GMBH, Vienna (AT)

( * ) Notice: Subject to any disclaimer, the term of this patent is extended or adjusted under 35 U.S.C. 154(b) by 0 days.

(21) Appl. No.: 17/284,132

(22) PCT Filed: Oct. 8, 2019

(86) PCT No.: PCT/EP2019/077184
§ 371 (c)(1),
(2) Date: Apr. 9, 2021

(87) PCT Pub. No.: WO2020/078768
PCT Pub. Date: Apr. 23, 2020

(65) Prior Publication Data
US 2021/0333470 A1 Oct. 28, 2021

(30) Foreign Application Priority Data
Oct. 17, 2018 (DE) .................... 10 2018 125 729.5

(51) Int. Cl.
*F21V 8/00* (2006.01)
*E06B 3/663* (2006.01)
*F21V 33/00* (2006.01)

(52) U.S. Cl.
CPC ........ *G02B 6/0095* (2013.01); *E06B 3/66376* (2013.01); *F21V 33/006* (2013.01); *G02B 6/0061* (2013.01)

(58) Field of Classification Search
CPC . G02B 6/0061; G02B 6/0095; E06B 3/66376; F21V 33/06
See application file for complete search history.

(56) References Cited

U.S. PATENT DOCUMENTS

| 9,250,382 B2 | 2/2016 | Ayoub et al. |
| 10,101,521 B1 * | 10/2018 | Burgio, Jr. ........... G02B 6/0061 |
| 2004/0031234 A1 | 2/2004 | Emde |
| 2015/0103557 A1 * | 4/2015 | Ayoub ................ G02B 6/0065 362/613 |
| 2016/0356942 A1 | 12/2016 | Cherekdjian et al. |
| 2020/0408033 A1 | 12/2020 | Haring |

FOREIGN PATENT DOCUMENTS

| WO | 02081844 A1 | 10/2002 |
| WO | 2004007887 A1 | 1/2004 |

OTHER PUBLICATIONS

PCT Application: PCT/EP2019/077184 filed Oct. 8, 2019—International Search Report dated Dec. 13, 2019.
PCT Application: PCT/EP2019/077184 Filed Oct. 8, 2019—International Preliminary Report on Patentability dated Apr. 14, 2021.

* cited by examiner

*Primary Examiner* — Thomas M Sember
(74) *Attorney, Agent, or Firm* — Simmons Perrine Moyer Bergman PLC

(57) ABSTRACT

The present invention includes a pane unit (1), which comprises a frame structure (2), an illuminable pane (4), a lighting element (5), and a receptacle (8) therefor, wherein a homogeneous light field is generated by the lighting, with, e.g. the lighting element (5), of at least one narrow side (7) of the illuminable pane (4).

27 Claims, 3 Drawing Sheets

ILLUMINABLE PANE UNIT

CLAIM OF PRIORITY

The present application claims priority to International Application PCT/EP2019/077184, filed Oct. 8, 2019, which in turn claims priority to German Application DE 10 2018 125 729.5, filed Oct. 17, 2018, which are incorporated by reference.

FIELD OF THE INVENTION

The present invention relates to a pane unit used to generate a homogeneous light field on and/or in an illuminable pane.

BACKGROUND OF THE INVENTION

Pane units with elements for surface illumination as are used in buildings are known from the prior art in different embodiment variants. EP 2 852 855 B1, for example, thus discloses a pane unit formed from a plurality of transparent layers, with the pane unit having an illuminable panel of transparent material arranged between two glass panels that are spaced apart from one another.

The insulating glass unit according to WO 2019 096 872 A1 discloses a technological advancement of such a pane unit. The pane unit or insulating glass unit disclosed there comprises a plurality of transparent layers that are spaced apart from one another, at least one of which is formed by an illuminable panel. An outer edge of the illuminable panel can be illuminated by an activatable lighting element, or the activatable lighting element can irradiate into the outer edge of the illuminable panel.

Many of the known illuminable pane units require a high input in order to ensure a homogeneous light distribution in the illuminable panel. Such switchable surface area light sources as known from the prior art are frequently designed in such a manner that they are not transparent in a switched-off state. It has been shown in practice that the desired homogeneity of the brightness of the emitted light, the maximum area, and the luminance are highly limited in terms of construction and/or generally cannot meet the requirements set. In addition, it has been shown that the surface area light sources can frequently be only insufficiently protected in terms of construction against, for example, dirt, dust, humidity, and surface scratching.

A further practical problem of surface area light sources as known from the prior art can, for example, lie therein that, depending on the design in terms of construction, the illuminable surfaces or panels require a certain amount of input for electric power supply. In addition, the developing heat buildup, which can potentially reach a considerable extent, can only be dissipated to the surrounding at a high input.

The practice has shown that it is frequently not possible to form a homogeneous light field to cover the entire area, or that undesired reflections result from the lighting of the area to be illuminated. Another problem to occur in many cases is that the switchable surface area light sources are not transparent to the desired degree in their switched-off state. The maximum area and luminance are also highly limited in terms of construction. In addition, surface area light sources as known from the prior art are deficient in terms of protection against dirt, dust, humidity, and/or surface scratching.

For this reason, one task of the present invention is to be seen in providing a variably illuminable pane unit that at least partly eliminates the above-mentioned disadvantages. A further task of the invention can be seen in providing a surface area light source with a homogeneous light field on and/or in a pane unit that can offer a desired degree of transparency with the lighting element not switched on.

These tasks are achieved by the object of the independent claim. Features of advantageous developments of the invention are set forth in the dependent claims.

SUMMARY OF THE INVENTION

In order to achieve the above-mentioned object, the present invention proposes a pane unit having the features of the independent claim, which pane unit comprises a frame structure that can, in particular, correspond to or resemble a frame structure of a customary pane. The frame structure of the pane unit according to the invention can be designed to be, for example, rectangular with rectilinear frame sections meeting at right angles, optionally also with frame sections that are formed to be curvilinear in some sections. In addition, the pane unit according to the invention comprises at least one illuminable pane. The illuminable pane can be supported and/or held by the frame structure.

The pane unit moreover has at least one receptacle fitted into the frame structure to receive at least one lighting element. In addition, at least one lighting element, in particular, an electrically operated lighting element, can be included, which radiates on and/or in the illuminable pane as soon as the lighting element is activated. Preferably, the at least one lighting element and also its associated receptacle are designed in such a manner that the at least one lighting element can provide for an at least approximately homogeneous light field on or in the illuminable pane. The arrangement or attachment of the at least one lighting element can be placed in the fitted receptacle on and/or along the at least one narrow side of the illuminable pane.

The frame structure of the invention can be manufactured, for example, from metal and/or synthetic material and/or wood and/or composite materials etc. It is likewise conceivable that the frame structure can assume, for example, a function in the assembly, such that it is possible to use advantageous variants of the pane unit, for example, as switchable windows, as door, as wall element, as room divider, as ceiling element, as anti-glare wall element, and—for reasons of easy cleaning and sterilization—in operating rooms as backlight, as element for smoking cabins, as element for waiting shelters, as rack shelf, as display cabinet element, as shop-fitting element, as stage construction element, as decoration element, as advertising material (posters etc.), as cable car element (floor, wall, or ceiling), as tread and/or riser, or in furniture manufacture.

A particularly advantageous optional embodiment variant of the pane unit results from the frame structure being provided with a potentially lockable guidance, recess, or corner angle construction in such a manner that at least one_lighting element can be removed for maintenance purposes and placed back in again. An appearance of the pane unit that is particularly interesting for the observer results from optional embodiment variants in which non-rectangular or round embodiments are used for the overall construction. The positioning of the lighting elements in these non-rectangular or round embodiments needs to be accordingly adapted.

Another appearance of the pane unit that is particularly interesting for the observer results from an optional embodiment variant of the invention in which the overall construction is designed in a curved manner. The bending radii of the components in these optional embodiment variants need to be accordingly adapted. This implies that the individual frame segments, which normally meet at right angles at their particular ends and thus form the corners of the pane unit, are not formed in a rectilinear manner, but rather curved or bent, thus leading to desired contours of the framing of the pane unit instead of a rectangular outline.

The invention comprises a pane unit, in which the at least one lighting element in the fitted receptacle is variably positionable and/or removable on and/or along the at least one narrow side of the illuminable pane.

A particularly advantageous optional embodiment variant of the pane unit results from at least one lighting element being positioned centrally to the illuminable pane with the irradiation parallel to the pane surface, in which case the light efficiency of the structure is particularly high. Such a central arrangement is intended to imply, in particular, that the at least one lighting element is arranged in the area of a longitudinal edge of the illuminable pane, to be specific, approximately in the area of or close to a symmetry plane dividing the pane area into two (imaginary) halves. Since the at least one lighting element is in this context positioned in a beneficial manner, light can be evenly applied to largely all areas of the pane, which is beneficial for an intended homogeneous light distribution.

Likewise particularly advantageous is an optional embodiment variant of the pane unit, in which an optical element is positioned in the frame structure, with the optical element coupling at least one lighting element directly with the illuminable pane. This option enables a particularly advantageous light efficiency, since a particularly low attenuation can be ensured and refraction effects can be largely prevented by the immediate in-coupling of light while preventing that a multiple boundary layer forms by a gap.

By using suitable lighting elements or frame structures, the pane unit according to the invention can be alternatively designed in such a manner that the light impression created in terms of brightness or color is different on the two sides of the pane unit.

The pane unit further comprises a lighting element, which can be formed from at least one individual (spotlight) light source and/or from a multiple spotlight emitting light source and/or from at least one linear light source. These light sources can be designed as incandescent light bulb, gas-discharge lamp, fluorescent lamp, LED, electroluminescent film, or another lighting device, and they can be operable at different operating voltages or supply frequencies.

The lighting element can completely or partly illuminate the area of the at least one illuminable pane. By using suitable lighting elements or frame structures, the pane unit according to the invention can be alternatively designed in such a manner that the light impression created in terms of brightness or color is different on both sides of the pane unit.

It is moreover conceivable that the pane unit can have a switchable and/or adjustable lighting element.

This results in a lighting element that can be optionally switched on and off or adjusted by the user. It is thus conceivable that the lighting element can also be controlled or remote-controlled via an app, and that it can be configured according to user requirements.

Furthermore, the pane unit can have a lighting element that is variably changeable and/or constant in brightness and/or in luminous color.

One option of the invention results from the embodiment of at least one lighting element with variable brightness or variable luminous color. This option is particularly advantageous in making it possible to use the pane unit for passenger information in passenger conveyance facilities, as luminescent background wall in planetariums, as queue management and guide systems in buildings such as hospitals, train stations, or airports. Alternatively, lighting elements emitting in infrared, in ultraviolet, or in separate spectral ranges can be additionally built into the frame structure of the pane units according to the invention. This can serve for simulating sunlight or for medical or phototherapeutic purposes. In particular, the deployment of lighting elements that completely or partly emulate the course of daylight or that are flicker-free enable an optional embodiment of the pane unit according to the invention that can be used in the area of Human Centric Lighting. This also allows creating very different lighting scenarios, for example for vanity mirrors.

A particularly advantageous use case can also be in occupational health applications, such as the realistic simulation of daylight for underground works. If the invention is used together with an appropriate sensor and control system and by changes of color and brightness of the lighting elements, it is additionally possible to display, for example, the current wind load.

The pane unit can also be designed in such a manner that the at least one illuminable pane comprises of a transparent material. An advantageous light efficiency of the structure results, for example, from the use of light-scattering synthetic material, preferably polymethyl methacrylate, or of light-scattering glass, lasered synthetic material, lasered glass, or other light-scattering material. The transparent panes enable easy and safe cleaning of the structure.

A particularly advantageous optional embodiment variant of the invention results from at least one illuminable pane being partly replaced by a transparent pane. In this case, the light emitted from the lighting elements penetrates the transparent pane with only very low light scattering and then impinges the remaining illuminable pane. The illuminable pane then emits the light of the lighting elements from the structure. The observer has the optical impression of an apparently floating light surface in the shape of the remaining illuminable pane. If the proportioning between illuminable pane and transparent pane is selected in a suitable manner, this optional structure makes it possible to have, for example, logos or other illustrations appear seemingly floating in space. Irradiation using synthetic glass results in different characteristics of refraction and reflection as compared to mineral glass.

Embodiments have proved successful in which the pane unit has an illuminable pane with switchable and/or tintable material and in which different light transmission conditions can be produced.

In particular, the optional embodiment of at least one illuminable surface or of at least one transparent pane from a switchable or tintable material, for example, as electrochromic, thermochromic, photochromic, liquid-crystal, or polymer-dispersed liquid-crystal glass, results, for example, in an application of the area light according to the invention as a switchable room divider.

Embodiments that have also proved successful in practice are such as have at least one transparent pane assigned to the at least one illuminable pane.

Moreover, embodiments have proved successful in which the at least one illuminable pane and/or transparent pane of the pane unit can have a one-piece or multi-piece design and the panes are spaced apart at a defined distance.

The at least one transparent pane is preferably made of clear glass and can serve for the protection of the at least one illuminable pane against dirt, dust, humidity, scratching, and ultraviolet light, for example, and it is also easy to clean.

If the illuminable pane is made of synthetic material, it is particularly advantageous for the at least one transparent pane to be made of mineral glass, because the illuminable pane is then additionally protected against dust from electrostatic effects of the synthetic material.

Advantageous embodiments of the invention can optionally also result from at least one illuminable and/or transparent pane being partly or completely made with special qualities. This includes the use, for example, of coated panes, opaque panes as privacy screen, high clarity panes, scratch-resistant panes, fully mirrored panes, partly mirrored panes, one-way mirrored panes, low-glare panes, ultraviolet light-filtering panes, or the use of vandal-proof panes. This makes it possible to apply the invention for a room divider, for example, that is viewing angle-dependent or that can only be seen through from one side.

It is also possible that the illuminable and/or transparent pane is manufactured from ultra-light material. This option can be used, for example, for floor surfaces, wall surfaces, or roof surfaces in passenger conveyance facilities, such as elevators, in order to save mass.

It is furthermore provided that the at least one illuminable and/or transparent pane of the pane unit can be full-area or partial-area colored and/or opaque.

A particularly high homogeneity of the color of the light emitted from the illuminable panes can be optionally generated by selecting suitable, high-quality lighting elements. In an optional embodiment variant, at least one of the illuminable panes or one of the transparent panes of the pane unit according to the invention can be designed completely or partly colored. This option can be produced, for example, in the form of solid-colored illuminable panes or transparent panes, or alternatively by applying films or by lacquering. This allows, for example, the depiction of illustrations or silhouettes, and can be used for artistic design and as advertising material.

It is also possible to design the illuminable and/or transparent pane in such a manner that is serves for the pictorial illustration of landscapes or streetscapes. This option can serve, for example, for the simulation of the view from windows.

It is moreover conceivable that the at least one illuminable pane of the pane unit has a minimum area of at least 100 cm$^2$ and/or, with the lighting element switched on, can have a luminance of at least approximately 50 cd/m$^2$ and/or a homogeneity of brightness of at least approximately 55%.

A particularly high homogeneity of the brightness of the light emitted from the illuminable panes can be optionally generated by increasing the number of lighting elements installed per unit length or by using particularly suitable materials for the illuminable panes. For an advantageous ratio of light efficiency to heat buildup, the lighting elements can preferably be designed as light-emitting diode. Potential purposes of application of the options with particularly high homogeneity of the brightness or of the color of the emitted light ensue in quality assurance, for example, in the evaluation of lacquered surfaces, films, glass, or textiles.

It is optionally possible that the at least one illuminable and/or transparent pane of the pane unit can be made of safety glass.

At least one transparent pane in the invention can be optionally made of tempered safety glass or of laminated safety glass. This is advantageous for use as homogeneously luminescent balustrade or guard rail, for example. The optional use of hurricane-proof glass, in particular, for the transparent pane of the pane unit according to the invention allows outdoor application even in very high wind speeds.

In a further option of the pane unit according to the invention, at least one illuminable pane or one transparent pane is made of ballistic glass (bullet-proof glass), burglar-proof glass, or impact-resistant glass. With the appropriate sensor and control system for the lighting elements, it is additionally possible, for example, to indicate an area under fire by changes of color and brightness of the lighting elements. In addition, the pane unit can be switched to opaque toward the bullet fire by using electrochromic, thermochromic, photochromic, liquid-crystal, or polymer-dispersed liquid-crystal glass for the illuminable pane or for the transparent pane.

It is also possible to design the pane unit in such a manner that the at least one illuminable and/or transparent pane is connectible and/or controllable and/or adjustable with external electronic components. The object of the invention can be optionally connected to sensors, control electronics, measuring instruments, or software in such a manner that, for example, status-indicating fire doors, flashing lights of vehicles, stop lights, and applications in the automotive, maritime, military, train, or aviation sectors can be realized.

A particularly advantageous optional embodiment variant of the invention results from a plurality of pane units being connected to form a display for media facades, interactive facades, or intelligent facades, which react to sensors or actions, or for shop windows, show cases, or guidance systems.

The invention optionally allows attaching a technical module to at least one illuminable and/or transparent pane. With this option, the pane unit according to the invention can be used as an optically appealingly designed technology wall. The technical module can be a monitor or a projection surface, for example. Both examples allow presenting moving pictures within the illuminable pane to an observer. In this instance, the technical module can also be partly milled into at least one illuminable pane or one transparent pane.

Furthermore, the pane unit can be constructed in such a manner that between at least two illuminable and/or transparent panes hollow spaces can be formed, which are fillable with gases and lockable in a diffusion-resistant manner (i.e. hermetically sealable).

An embodiment variant with a gas filling enables creating optical effects caused by the gas, for example. A particularly advantageous optional embodiment variant of the area light according to the invention results from the transparent panes being designed gas diffusion-resistant via the frame structure as insulating glass. It is then particularly easy to use the area light according to the invention as homogeneously luminescent external window, external door, facade element, roof element, or bridge floor element.

It is finally possible that the frame structure of the pane unit is configured to integrate the power supply and/or a heat dissipation element of the at least one lighting element. A particularly advantageous optional embodiment variant of the pane unit according to the invention results from integrating the power supply into the frame structure, as in this case the optical impression of a planar surface of the illuminable panes is not disturbed.

BRIEF DESCRIPTION OF THE FIGURES

In the following passages, the attached figures further illustrate typical embodiments of the invention and their advantages. The size ratios of the individual elements in the figures do not necessarily reflect the real size ratios. It is to be understood that in some instances various aspects of the invention may be shown exaggerated or enlarged in relation to other elements to facilitate an understanding of the invention.

Figure 1:
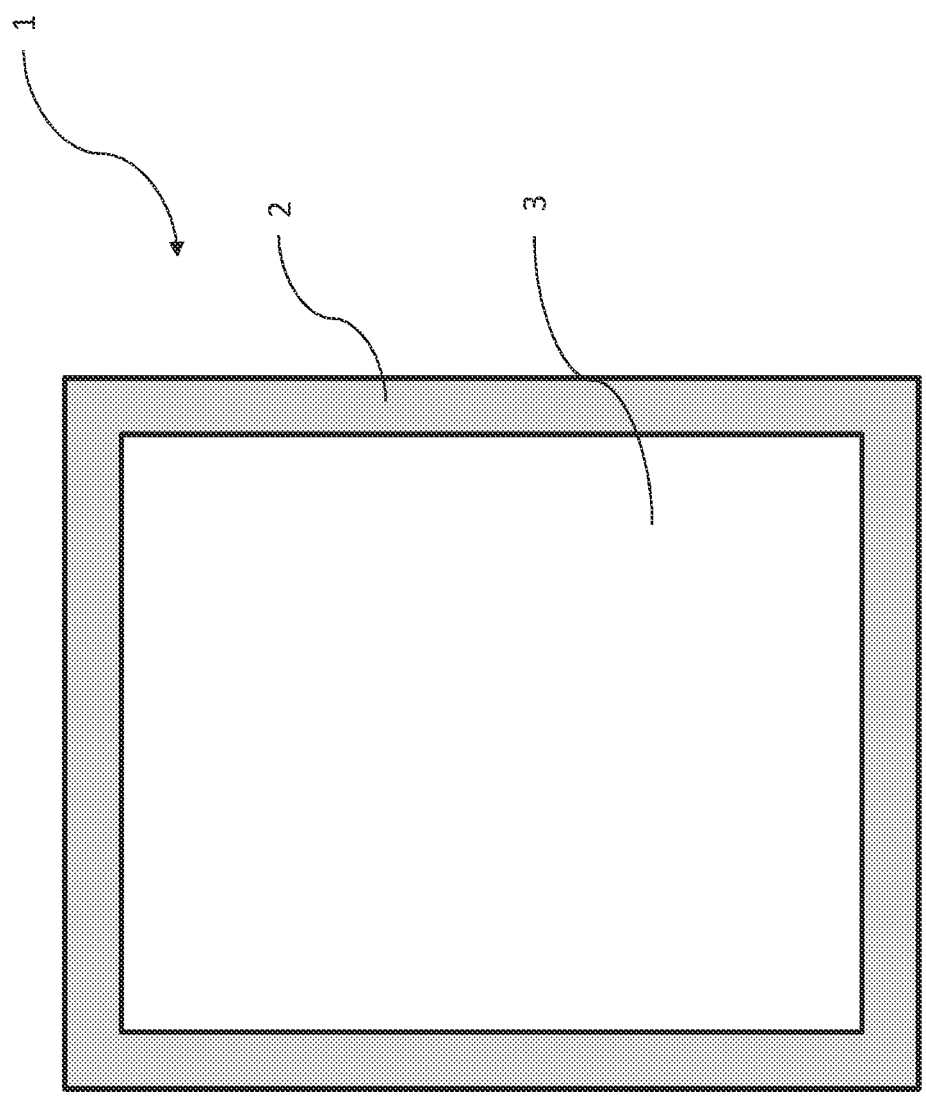
FIG. 1 shows a schematic front view of the pane unit according to the invention

The same or equivalent elements of the invention are designated using identical reference characters. Furthermore and for the sake of clarity, only the reference characters relevant for describing the individual figures are provided. It should be understood that the detailed description and specific examples, while indicating preferred embodiments of the object according to the invention, are intended for purposes of illustration only and are not intended to limit the scope of the invention.

DETAILED DESCRIPTION OF THE INVENTION

FIG. 1 shows a schematic front view of a preferred embodiment of the pane unit 1 according to the invention. The frame structure 2 comprises a one-piece transparent pane 3, and the frame structure 2 holds the pane 3 in the desired position. In this exemplary embodiment, the illuminable pane 4 is concealed by the transparent pane 3, with all elements of the pane unit 1 being constructed in a rectangular manner. However, it is also possible that the pane unit is formed by other shapes in other embodiments. It is likewise possible that the transparent pane 3 is formed in different sizes, forms, colors, etc. and/or has a multi-piece design.

Figure 2:
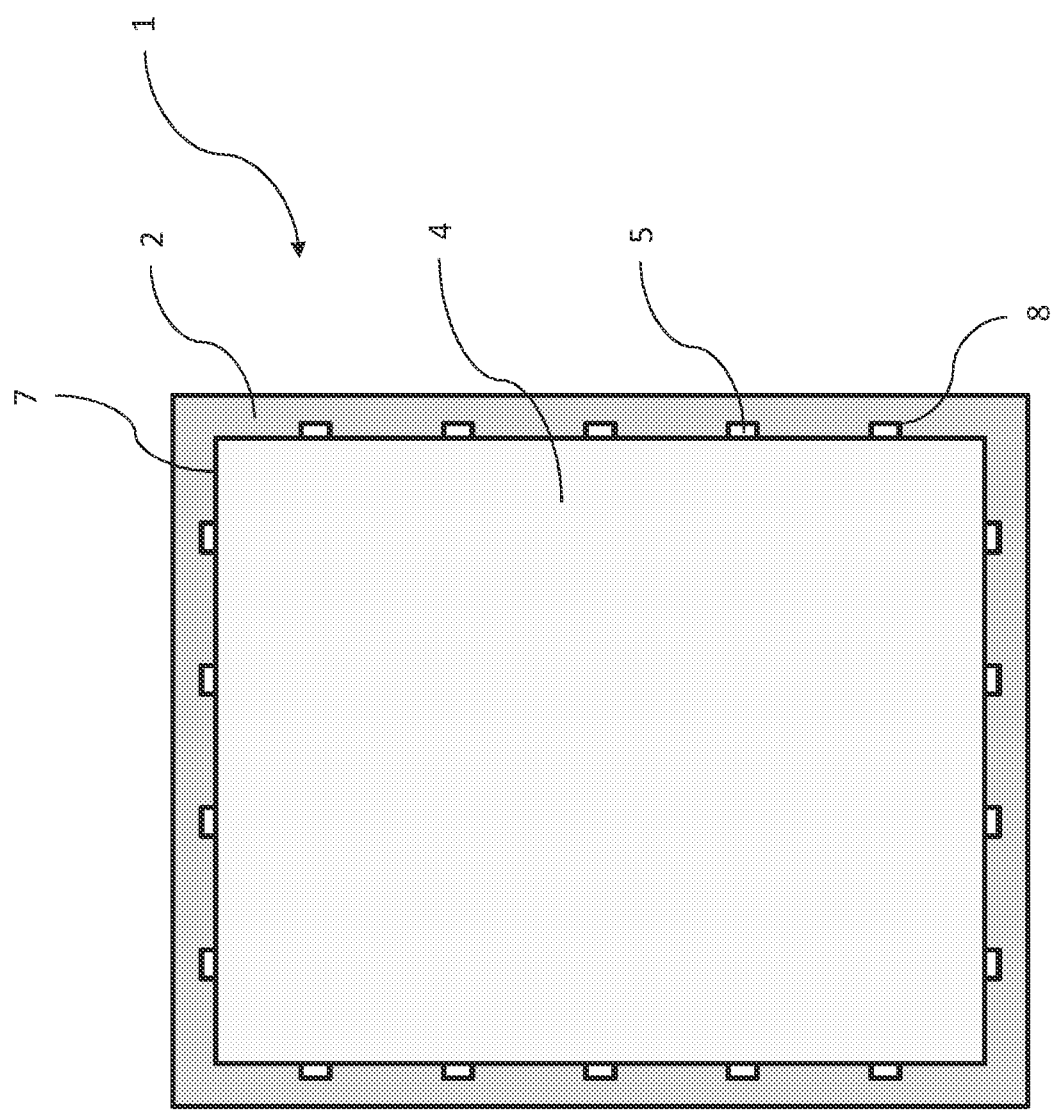
FIG. 2 shows a schematic sectional view of the one-piece illuminable pane.

FIG. 2 shows a schematic sectional view of a preferred embodiment of the one-piece, illuminable pane 4 of the pane unit 1. The sectional view illustrates the arrangement of lighting elements 5 on the illuminable pane 4. The frame structure 2 comprises an illuminable pane 4, which is illuminated from all four sides of the illuminable pane 4 by the lighting elements 5 arranged in the frame structure 2. In this context, the lighting elements 5 are integrated into the frame structure 2 and arranged in such a manner that an even light appearance is generated in the illuminable pane 4. In order to generate an even light appearance, the individual lighting elements 5 are regularly spaced apart in the FIG. 2, but in other embodiments, the lighting elements 5 can also be irregularly spaced apart and/or designed in pairs and/or as continuous light strip etc. The separate lighting elements 5 shown in the illustration can be designed as individual single light sources or in pairs, as fluorescent tubes, as light bands, etc. The rectangular design of the embodiment illustrated in FIG. 2 is not mandatory, and other embodiments of the invention can likewise be round, oval, or the like. The illuminable pane 4 can have one or more transparent panes 3 assigned to it, which can also be fitted into the frame structure.

Figure 3:
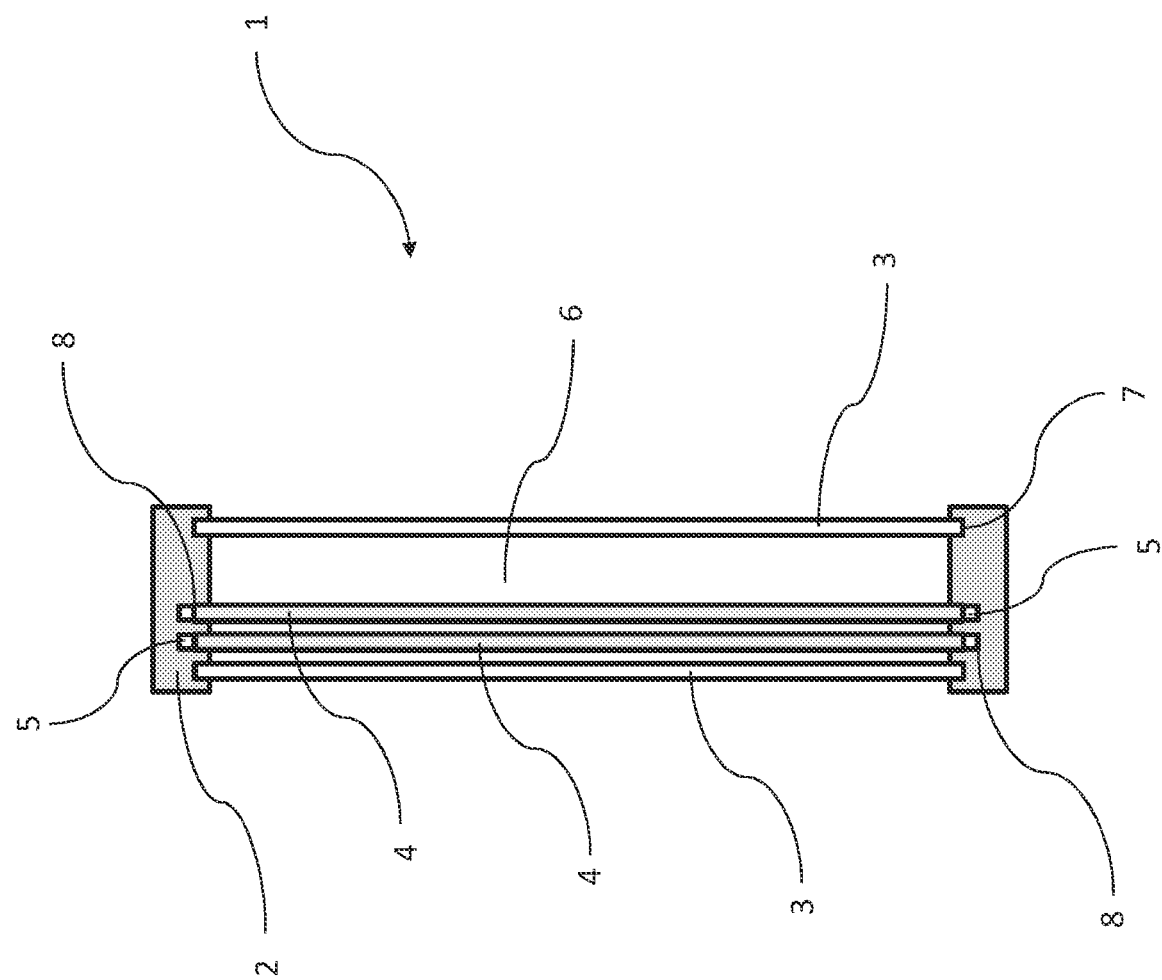
FIG. 3 shows a schematic sectional view of the frame structure

FIG. 3 shows a schematic sectional view of a preferred embodiment of the frame structure 2 of the pane unit 1. The frame structure 2 locates the transparent panes 3, the illuminable panes 4, and the lighting elements 5 in the positions intended therefor and at a defined spacing. In this connection, the illuminable panes 4 are in each case shielded from the transparent panes 3 on both sides, with the space between the panes not being determined but being variable. The transparent panes 3 serve for the protection of the illuminable panes 4 from weather influences, damages, etc. The lighting elements 5 are in each case arranged on the sides 7 of the illuminable panes 4 in a therefor provided receptacle, and they can be fixedly located on the pane in other embodiment variants, or they can be accessible and removable. The switched-on lighting elements 5 illuminate the illuminable panes 4 and generate a homogeneous light field. In a preferred embodiment, it is possible with the lighting elements switched off to see through the illuminable panes and transparent panes. The hollow space 6 formed in the FIG. 3 by the arrangement of the multiple panes can be gas-tightly locked in such a manner that the hollow space 6 can fulfill an insulating function. The hollow space 6 can also be filled with various gases, liquids, etc., thus resulting in further possible uses and fields of application.

The embodiments, examples and alternatives of the preceding paragraphs, the claims, or the following figures and description, including any of their various aspects or respective individual features, may be taken independently or in any combination. Features described in connection with one embodiment are applicable to all embodiments, unless such features are incompatible.

If illustrations and aspects are generally referred to as being "schematic" in the context of the figures, this is by no means intended to imply that the illustration of the figures and their description are of inferior significance with regard to the disclosure of the invention. The person skilled in the art is fully capable of gathering sufficient information from the schematically and abstractly drawn illustrations for facilitating the understanding of the invention without the understanding being in any way impaired by, for example, the size ratios of the drawings of the pane unit and/or of parts of the object or of other of the elements being drawn and being potentially not precisely true to scale. On the basis of the concrete realizations of the object according to the invention explained in the figures, the person skilled in the art as a reader is thus enabled to derive a better understanding of the inventive idea, which is formulated in a more general and/or more abstract manner in the claims and in the general part of the description.

The invention has been described with reference to a preferred embodiment. Those skilled in the art will appreciate that numerous changes and modifications can be made to the preferred embodiments of the invention and that such changes and modifications can be made without departing from the spirit of the invention. It is therefore intended that the appended claims cover all such equivalent variations as fall within the true spirit and scope of the invention.

LIST OF REFERENCE CHARACTERS

1 Pane unit
2 Frame structure
3 Transparent pane
4 Illuminable pane
5 Lighting element
6 Hollow space
7 side
8 Receptacle

We claim:
1. A pane unit (1), comprising:
a frame structure (2),
at least two transparent panes (3), at least one illuminable pane (4), which is supported or held by the frame structure (2) and is arranged between the at least two transparent panes (3), at least one lighting element (5), which radiates on or in the at least one illuminable pane (4), and which at least one lighting element (5) forms an at least approximately homogeneous light field on or in the illuminable pane (4), a plurality of receptacles (8) in the frame structure (2), the plurality of receptacles (8) serving to receive each of the at least two transparent panes (3), the at least one illuminable pane (4), and the at least one lighting element (5), wherein the arrangement of the at least one lighting element (5) in one of the plurality of receptacles (8) is on or along at least one side (7) of the illuminable pane (4).

2. The pane unit (1) of claim 1, wherein the at least one lighting element (5) is variably positionable along the at least one side (7) or removable from the at least one side (7).

3. The pane unit (1) of claim 1, wherein the at least one lighting element (5) is at least one individual light source that is a single spotlight source, a multiple spotlight source, or from at least one linear light source.

4. The pane unit (1) of claim 1, wherein the at least one lighting element (5) is switchable and/or adjustable.

5. The pane unit (1) of claim 1, wherein the at least one lighting element (5) is variably changeable or constant in brightness or in luminous color.

6. The pane unit (1) of claim 1, wherein the at least one illuminable pane (4) comprises a transparent material.

7. The pane unit (1) of claim 6, wherein different light transmission conditions can be produced in the at least one illuminable pane (4).

8. The pane unit (1) of claim 7, in which the at least one illuminable pane (4) is provided with switchable or tintable material.

9. The pane unit (1) of claim 7, wherein the at least one illuminable pane (4) or the at least two transparent panes (3) comprise one or more pieces.

10. The pane unit (1) of claim 9, wherein the at least one illuminable pane (4) or the at least two transparent panes (3) is full-area or partial-area colored or opaque.

11. The pane unit (1) of claim 10, wherein the at least one illuminable pane (4) has a minimum area of at least 100 cm$^2$ or, with the lighting element (5) switched on, has a luminance of at least approximately 50 cd/m$^2$, or a homogeneity of brightness of at least approximately 55%.

12. The pane unit (1) of claim 7, wherein the at least one illuminable pane (4) or the at least two transparent panes (3) comprise glass.

13. The pane unit (1) of claim 7, wherein the at least one illuminable pane (4) or the at least two transparent panes (3) are controllable or adjustable with external electronic components.

14. The pane unit (1) of claim 7, further comprising hollow spaces (6) between at least two illuminable panes (4) or the at least two transparent panes (3), wherein the hollow spaces (6) are hermitcally sealable.

15. The pane unit (1) of claim 1, wherein the frame structure (2) further comprises a power supply, or a heat dissipation element of the at least one lighting element (5).

16. The pane unit (1) of claim 1 further comprising at least two illuminable panes (4), each received in at least one separate receptacle (8).

17. The pane unit (1) of claim 1, wherein the illuminable pane (4) is made of a synthetic material and the at least two transparent panes (3) comprise mineral glass.

18. The pane unit (1) of claim 1 wherein the at least one illuminable pane (4) or the at least two transparent panes (3) comprise ballistic glass, burglarproof glass, or impact-resistant glass.

19. The pane unit (1) of claim 18 further comprising a control system capable of: (a) changing a color or bringiness of the at least one lighting element (5) to indicate an area of the at least one illuminable pane (4) or the at least two transparent panes (3) that is damaged; or (b) changing transparency of the at least one illuminable pane (4) or the at least two transparent panes (3) in response to damage to the at least one illuminable pane (4) or the at least two transparent panes (3).

20. The pane unit (1) of claim 19 wherein the at least one illuminable pane (4) or the at least two transparent panes (3) comprise electrochromic, thermochromic, photochromic, liquid-crystal, or polymer-dispersed liquid-crystal glass and wherein the control system changes the transparency of the at least one illuminable pane (4) or the at least two transparent panes (3) in response to damage.

21. The pane unit (1) of claim 1 further comprising one or more sensors, one or more control electronics, one or more measuring instruments capable of status-indicating fires doors, flashing lights of vehicles, or traffic signals.

22. The pane unit (1) of claim 1 further comprising a plurality of pane units (1) capable of forming a display.

23. The pane unit (1) of claim 1 further comprising a technical module connected to the at least one illuminable pane (4) or the at least two transparent panes (3) capable of presenting moving pictures within the at least one illuminable pane (4) or the at least two transparent panes (3).

24. The pane unit (1) of claim 1 wherein the frame structure (2) is adaptable to allow the at least one lighting element to be removed and then be replaced.

25. The pane unit (1) of claim 1 wherein a first space between a first transparent pane and the at least one illuminable pane (4) is different than a second space between a second transparent pane and the at least one illuminable pane (4).

26. A pane unit (1), comprising:
   a frame structure (2) having a plurality of receptacles (8),
   at least two transparent panes (3) each located within at least one of the plurality of receptacles (8),
   at least one illuminable pane (4), located within at least one of the plurality of receptacles (8), and arranged between the at least two transparent panes (3),
   at least one lighting element (5), located within at least one of the plurality of receptacles (8), and which radiates on or in the at least one illuminable pane (4), and which at least one lighting element (5) forms an at least approximately homogeneous light field on or in the illuminable pane (4),
   wherein the the at least one lighting element (5) is arranged on or along at least one side (7) of the illuminable pane (4).

27. The pane unit (1) of claim 26 further comprising at least two illuminable panes (4), each received in at least one separate receptacle (8).

* * * * *